United States Patent
Zhuang et al.

(10) Patent No.: US 10,191,592 B2
(45) Date of Patent: Jan. 29, 2019

(54) TOUCH-CONTROL DISPLAY PANEL AND DISPLAY DEVICE, AND DRIVING METHOD OF DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Zhilong Zhuang, Xiamen (CN); Jiancai Huang, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 99 days.

(21) Appl. No.: 15/475,278

(22) Filed: Mar. 31, 2017

(65) Prior Publication Data

US 2017/0205960 A1 Jul. 20, 2017

(30) Foreign Application Priority Data

Oct. 26, 2016 (CN) .......................... 2016 1 0993350

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04105* (2013.01)

(58) Field of Classification Search
CPC ...... G06F 3/0418; G06F 3/0412; G06F 3/044; G06F 2203/04105
See application file for complete search history.

(56) References Cited

U.S. PATENT DOCUMENTS

| | | | |
|---|---|---|---|
| 9,524,020 B2 * | 12/2016 | Perlin ................... | G06F 3/0414 |
| 2006/0250373 A1 * | 11/2006 | Sakurai .................. | G06F 3/044 |
| | | | 345/173 |
| 2015/0317020 A1 * | 11/2015 | Watanabe ............... | G06F 3/044 |
| | | | 345/173 |

FOREIGN PATENT DOCUMENTS

| CN | 205068343 U | 3/2016 |
|---|---|---|
| CN | 205068346 U | 3/2016 |

* cited by examiner

*Primary Examiner* — Rodney Amadiz
(74) *Attorney, Agent, or Firm* — Anova Law Group, PLLC

(57) ABSTRACT

A display panel includes a plurality of touch electrodes disposed on a first substrate, and a second pressure sensing electrode disposed on a second substrate facing the first substrate and in a grid-shape. The plurality of touch electrodes are used for touch position detection in a touch position detection period, and at least certain number of the plurality of touch electrodes are multiplexed as first pressure sensing electrodes in a touch force detection period. The orthogonal projection of the first pressure sensing electrodes on the second substrate is at least partially overlapped with the second pressure sensing electrode. Further, in the touch force detection period, the first pressure sensing electrodes and the second pressure sensing electrode are used together to detect a touch force applied on the display panel.

17 Claims, 4 Drawing Sheets

TOUCH-CONTROL DISPLAY PANEL AND DISPLAY DEVICE, AND DRIVING METHOD OF DISPLAY PANEL

CROSS-REFERENCES TO RELATED APPLICATIONS

This application claims priority of Chinese Patent Application No. 201610993350.1, filed on Oct. 26, 2016, the entire contents of which are hereby incorporated by reference.

FIELD OF THE DISCLOSURE

The present disclosure generally relates to the field of display technology and, more particularly, relates to a display panel, a driving method of the display panel, and a touch-control display device of the display panel.

BACKGROUND

With the rapid development of display technology, touch display technology has been gradually spreading throughout people's lives. In existing display panels, in comparison with resistive-type touch display panels, capacitive-type touch display panels have certain advantages, such as a long product life, high transmittance, and ability to support multi-point touch, etc., and have become a focal point of the touch display technology. Currently, the touch panel can be divided into add-on mode touch display panels, on-cell touch display panels, and in-cell touch display panels.

Further, most existing touch display panel often can only detect touch positions, but cannot detect the touch force perpendicular to the touch display panel when a linger presses on the touch display screen. To solve this problem and to achieve richer touch operations, the force touch technology capable of detecting the degree of pressing force on the touch display panel by the user has attracted more and more attentions.

Therefore, it is desired to provide a touch display panel that can achieve both touch position detection and touch force detection. The disclosed systems and methods are directed to solving at least partial problems set forth above and other problems. It should be noted that, the information disclosed in the background section is only used to enhance understanding of the background of the present disclosure, and may thus include existing information readily known to those ordinarily skilled in the art.

BRIEF SUMMARY OF THE DISCLOSURE

One aspect of the present disclosure includes a display panel. The display panel includes a plurality of touch electrodes disposed on a first substrate, and a second pressure sensing electrode disposed on a second substrate facing the first substrate and in a grid-shape. The plurality of touch electrodes are used for touch position detection in a touch position detection period, and at least certain number of the plurality of touch electrodes are multiplexed as first pressure sensing electrodes in a touch force detection period. The orthogonal projection of the first pressure sensing electrodes on the second substrate is at least partially overlapped with the second pressure sensing electrode. Further, in the touch force detection period, the first pressure sensing electrodes and the second pressure sensing electrode are used together to detect a touch force applied on the display panel.

Another aspect of the present disclosure includes a driving method for a display panel. The display panel includes a plurality of touch electrodes disposed on a first substrate and a second pressure sensing electrode disposed on a second substrate facing the first substrate and having grid lines and grid openings surrounded by the grid lines. The driving method includes, in a touch position detection period, supplying the plurality of touch electrodes with a first drive signal, and receiving touch position detection signals through the plurality of touch electrodes. The driving also includes, in a touch force detection period, multiplexing at least certain number of the plurality of touch electrodes as first pressure sensing electrodes, supplying the first pressure sensing electrodes with a second drive signal, supplying the second pressure sensing electrode with a fixed voltage, and receiving force detection signals through the first pressure sensing electrodes.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the disclosure. Apparently, the drawings described below only correspond to some embodiments of the present disclosure, and it is possible for those ordinarily skilled in the art to derive other drawings from the accompanying drawings without creative effort.

DETAILED DESCRIPTION

Figure 1:
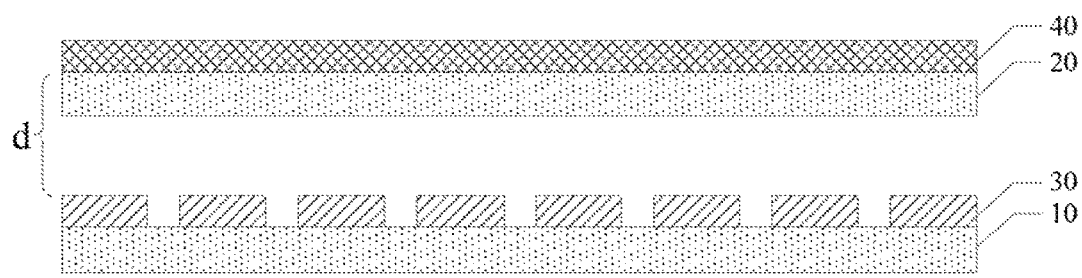
FIG. 1 illustrates a structural diagram of an exemplary display panel consistent with the disclosed embodiments.

Exemplary embodiments will be described in detail hereinafter with reference to accompanying drawings. However, embodiments of the present disclosure may be implemented in many different forms and should not be construed as being limited to the embodiments set forth herein. Rather, these embodiments are provided so that the present disclosure can be understood by those skilled in the art. The described features, structures, or characteristics may be combined in any suitable manner in one or more embodiments. In the following description, numerous specific details are given to provide understanding of embodiments of the present disclosure. Those skilled in the relevant art will recognize, however, that technical solutions of the present disclosure can be practiced without one or more of the specific details, or with other methods, components, devices, or steps, etc.

In addition, the accompanying drawings of the present disclosure are only schematic, like reference numerals in the drawings denote same or like elements, and thus repetitive description thereof may be omitted. Further, in addition to illustrating hardware components, certain block diagrams illustrated in accompanying drawings may be functional entities, and may not necessarily correspond to physically or logically independent entities. These functional entities may be implemented by means of software, or one or more hardware modules or an integrated circuit. Or, these functional entities may be implemented in different networks and/or processes devices and/or microcontroller devices.

FIG. 1 illustrates an exemplary display panel according to embodiments of the present disclosure. As shown in FIG. 1, the display panel may include a first substrate 10, a second substrate 20, a plurality of touch electrodes 30, and a second pressure sensing electrode 40, etc. Some or all of the plurality of touch electrodes 30 may be multiplexed as first pressure sensing electrodes, i.e., at least certain number of the plurality of touch electrodes 30 may be multiplexed as the first pressure sensing electrodes.

The first substrate 10 and the second substrate 20 may be disposed facing each other. The plurality of touch electrodes 30 are provided on the first substrate 10, and the second pressure sensing electrode 40 may be a grid-like or grid-shaped electrode and provided on the second substrate 20.

In touch operation, the display panel may include a touch position detection period and a touch force detection period. During the touch position detection period, the plurality of touch electrodes 30 may be used to detect the touch position and, during the touch force detection period, at least part of the plurality of touch electrode 30 are multiplexed as first pressure sensing electrodes, corresponding to the second pressure sensing electrode 40.

Further, the orthogonal projection of the first pressure sensing electrodes on the second substrate is at least partially overlapped with the second pressure sensing electrode 40. The first pressure sensing electrodes and the second pressure sensing electrode 40 may be used to cooperate with each other to detect the touch pressure or touch force.

Accordingly, on one hand, the second pressure sensing electrode 40 is a grid-shaped electrode, with a weak shielding effect. In the touch position detection period, the electric field lines of the respective touch electrodes 30 can pass through the grid-shaped second pressure sensing electrode 40 to be coupled with the user's finger to cause a change in the potential. Thus, the touch position of the user's finger can be determined with a combination of the potential and the position of each touch electrode 30.

On the other hand, in the touch force detection period, the touch electrodes 30 may be multiplexed as the first pressure sensing electrodes so as to form corresponding detection capacitors with the second pressure sensing electrode 40. When an external object (e.g., the user's finger) is applied onto the second pressure sensing electrode 40, the distance d between the first pressure sensing electrode 30 and the second pressure sensing electrode 40 may be changed, and the capacitance value of the detection capacitor may also be changed. Thus, it is possible to determine the touch force of the user's finger by combining the capacitance values of the various detection capacitors corresponding to the various first pressure sensing electrode 30.

Further, because the touch position and the touch force can be detected by two layers of electrodes, the structure of the display panel can be made simpler, and the display panel can be further made more light-weighted and thinner. As the number of required electrode layers is small, the number of required fabrication processes is also less, and the manufacturing efficiency of the display panel can be improved and the manufacturing cost of the display panel can be reduced.

Figure 2:
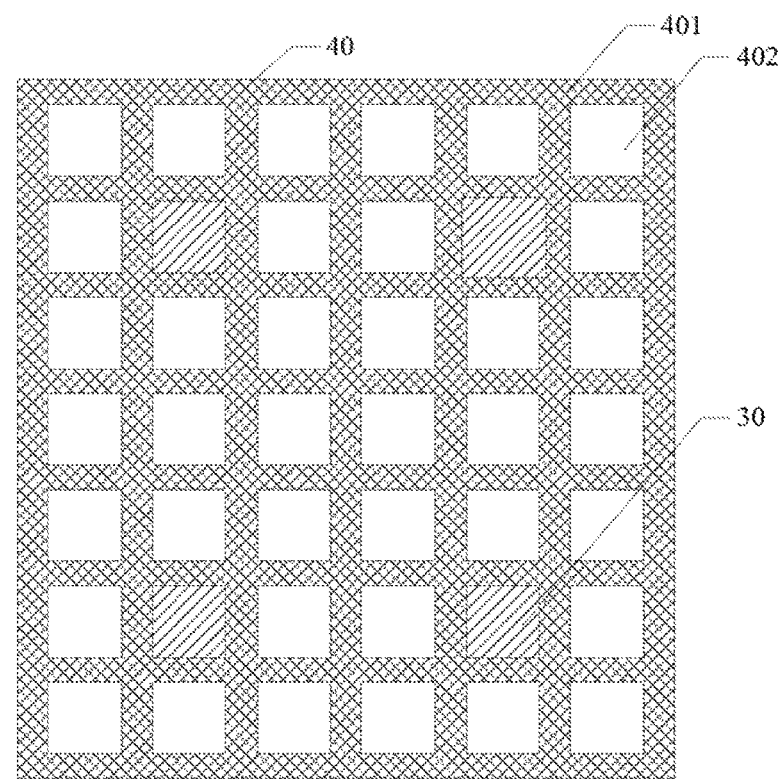
FIG. 2 illustrates a structural diagram of an exemplary pressure sensing electrode consistent with the disclosed embodiments.

FIG. 2 illustrates an exemplary second pressure sensing electrode. As shown in FIG. 2, the second pressure sensing electrode 40 may include grid lines 401 and grid openings 402 surrounded by the grid lines 401. The width of the grid lines 401, and the shape of the grid openings may be determined based on specific applications.

Further, to prevent the second pressure sensing electrode 40 from adversely affecting the display effect, the second pressure sensing electrode 40 can be formed by a transparent conductive material so that the reflection effect of the second pressure sensing electrode 40 can be reduced. For example, in certain embodiments, the material of the second pressure sensing electrode 40 may be indium tin oxide (ITO). In other embodiments, the material of the second pressure sensing electrode 40 may be indium zinc oxide (IZO) or other transparent conductive materials.

In certain embodiments, the second substrate 20 may include a black matrix region (not shown in FIG. 2), and the grid lines 401 in the second pressure sensing electrode 40 may be disposed in the black matrix region, without affecting the transmittance of the display panel.

To prevent the shielding effect of the second pressure sensing electrode 40 from substantially affecting the detection of the touch position, the sum $S_1$ of the areas of all the grid openings 402 may satisfy a predetermined condition, such as: $S_1/S_0 > 1 - K \times R_0/R_m$, where $S_0$ is the area of a plate electrode having the same contour as the second pressure sensing electrode 40 (i.e., a second pressure sensing electrode that is the same as the second pressure sensing electrode 40 but without the grid openings 402, hereinafter referred to as a first hypothetical electrode); K (K>1) is the shielding effect attenuation coefficient, and the actual value of K depends on the magnitude of the attenuation of the shielding effect when the second pressure sensing electrode 40 is set to floating while in the touch position detection period. The specific value of K may be measured by experiments, or may be calculated by simulation. $R_0$ is the impedance value of the first hypothetical electrode, and $R_m$ is an impedance threshold. When the impedance value $R_0$ of the second pressure sensing electrode 40 is smaller than the impedance threshold value $R_m$, the shielding effect of the second pressure sensing electrode 40 may substantially interfere with the detection of the touch position. The specific value of $R_m$ may be measured by experiments, or may be calculated by simulation.

For example, in one embodiment, the impedance value $R_0$ of the first hypothetical electrode may be approximately $10^2$, the impedance threshold value $R_m$ may be approximately $10^5$, and it is assumed that the value of K is 400. Thus, the sum $S_1$ of the areas of all grid openings 402 may be selected to satisfy $S_1/S_0 > 60\%$. That is, mare than 60% of the second pressure sensing electrode 40 are openings. Other values and calculation methods may also be used, and the sum $S_1$ of the areas of all grid openings 402 may also satisfy other conditions.

Further, to reduce the shielding effect of the second pressure sensing electrode 40, the larger the sum of areas of all grid openings 402, the better. However, when the area of the grid openings 402 directly being a first pressure sensing electrode is too large, it may affect the formation of the capacitors between the second pressure sensing electrode 40 and the first pressure sensing electrode, and the touch force detection may be adversely affected.

Thus, in certain embodiments, the area $S_3$ of the grid openings 402 in the second pressure sensing electrode 40 directly facing a first pressure sensing electrode 30 may be selected to satisfy a predetermined condition, such as: $S_3/S_4 < 1 - C_m/(\tau \times C_0)$, where $S_4$ is the area of a plate electrode in a layer same as the second pressure sensing electrode and having the same contour as the first pressure sensing electrode 30 (i.e., a second pressure sensing electrode that is the same as the projection of the first pressure sensing electrode 30 on the second substrate 20, but without the grid openings 402, hereinafter referred to as a second hypothetical electrode), that is, same as the area of the first pressure sensing electrode. $C_m$ is a capacitance threshold and, when the capacitance value of the capacitor formed by the first pressure sensing electrode and the second pressure sensing electrode 40 is smaller than the capacitance threshold value $C_m$, it may be difficult to achieve the detection of the touch pressure. The specific value of $C_m$ can be obtained by experimental measurements or may also be calculated by simulation. $C_0$ is a capacitance value between the first pressure sensing electrode and the second hypothetical electrode, and $\tau$ is the capacitance attenuation coefficient, whose specific value may be obtained by experimental measurement, or may be calculated by simulation.

For example, in one embodiment, the value of $C_m/C_0$ may be approximately 0.5, and it is assumed that the value of $\tau$ is 1.5. Thus, the area $S_3$ of the grid openings 402 in the second pressure sensing electrode 40 directly facing the first pressure sensing electrode 30 may be selected to satisfy: $S_3/S_4 < 66.7\%$. That is, less than 66.7% of the second hypothetical electrode are openings. Other values and calculation methods may also be used, and the area $S_3$ of the grid openings 402 may also satisfy other conditions.

Figure 3:
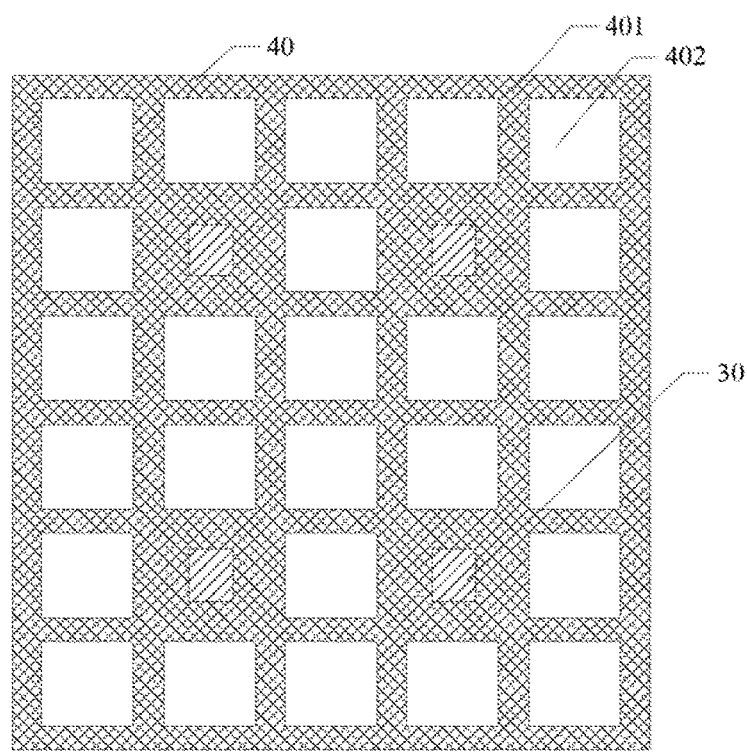
FIG. 3 illustrates a structural diagram of another exemplary force sensitive electrode consistent with the disclosed embodiments.

FIG. 3 illustrates another exemplary second pressure sensing electrode. As shown in FIG. 3, to reduce the shielding effect of the second pressure sensing electrode 40 without affecting the detection of the touch position, the area of the grid openings 402 in the second pressure sensing electrode 40 directly facing the first pressure sensing electrode may be reduced, while the area of the openings 402 in the second pressure sensing electrode 40 not directly facing the first pressure sensing electrode may be increased.

That is, the area of the grid opening 402 in the second pressure sensing electrode 40 directly facing the first pressure sensing electrode is smaller than the area of the grid openings 402 in the second pressure sensing electrode 40 not directly facing the first pressure sensing electrode. In addition, to avoid affecting the aperture ratio of each sub-pixel in the display area, the area of the grid opening 402 may be set to at least the area of one sub-pixel. For example, the area of the grid opening 402 may be set to the areas of two sub-pixels, or five sub-pixels, etc.

To further reduce the number of the electrode layers in the display panel, the touch electrodes 30 or the second pressure sensing electrode may be multiplexed as a common electrode during an image display period. The common electrode is mainly used to provide a common voltage signal so that an electric field can be formed with the pixel electrodes to control on and off of the optical switch for the pixels. For example, in certain embodiments, instead of using a plate electrode as the common electrode, an array of M×N block electrodes may be used as an equivalent of the plate electrode, and each of the block electrodes may be a touch electrode 30, where M and N are integers representing the row and column numbers of the block electrode array, respectively.

Because the multiplexing of the common electrode and the touch electrodes, the structure of the display panel can be made simpler, and the display panel can be further made more light-weighted and thinner. As the number of required electrode layers is small, the number of required fabrication processes is also less, and the manufacturing efficiency of the display panel can be improved and the manufacturing cost of the display panel can be reduced.

Figure 4:
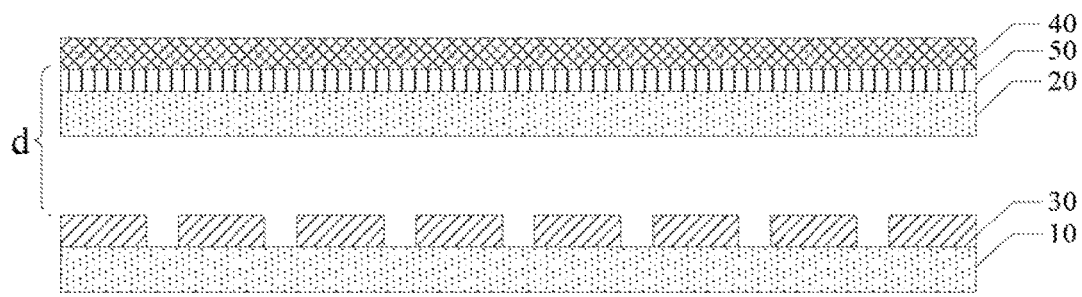
FIG. 4 illustrates a structural diagram of another exemplary display panel consistent with the disclosed embodiments.

FIG. 4 illustrates another exemplary display panel. As shown in FIG. 4, in addition to the first substrate 10, second substrate 20, plurality of touch electrodes 30, and second pressure sensing electrode 40, the display panel may also include a transparent elastic material layer 50. The transparent elastic material layer 50 may be disposed between the first pressure sensing electrodes 30 and the second pressure sensing electrode 40.

For example, the elastic material layer 50 may be provided between the second pressure sensing electrode 40 and the second substrates 20. By providing the transparent elastic material layer 50 between the first pressure sensing electrode and the second pressure sensing electrode 40, it may be able to use the characteristics of a large deformation range of the elastic material layer 50 to increase the amount of change in the distance d between the first pressure sensing electrode and the second pressure sensing electrode 40 during the touch force detection period. Thus, the amount of change in the capacitance formed by the first pressure sensing electrode and the second pressure sensing electrode 40 may also be increased, thereby achieving a more sensitive and more accurate detection of the touch force.

Figure 5:
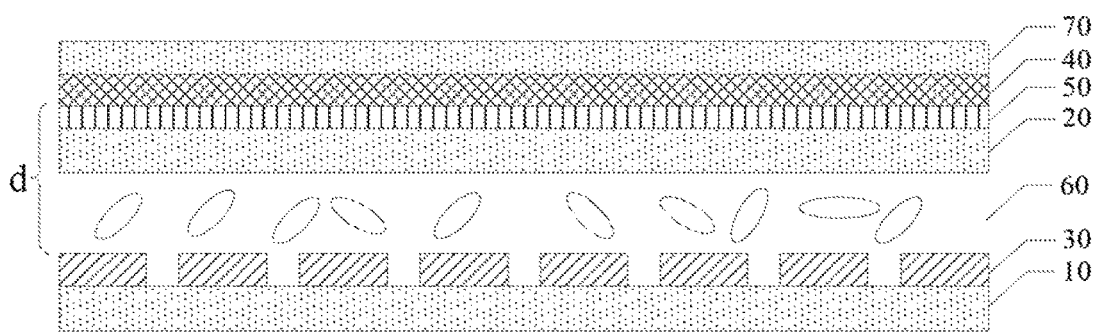
FIG. 5 illustrates a structural diagram of another exemplary display panel consistent with the disclosed embodiments.

The material of the transparent elastic material layer 50 may be rubber or other polymer, or any other appropriate composite materials. In certain embodiments, the display panel may be a liquid crystal display (LCD) panel, an organic light emitting display (OLED) panel, an electronic paper display panel, or any other type of display panel. FIG. 5 illustrates an exemplary LCD panel consistent with the disclosed embodiments.

As shown in FIG. 5, using the LCD panel as an example, the first substrate 10 may be an array substrate, and a plurality of scanning lines and a plurality of data lines may be provided on the array substrate. The plurality of scanning lines and the plurality of data lines may intersect between each other to define a plurality sub-pixel regions and corresponding wiring circuitry, and each sub-pixel region may include one or more thin film transistors.

The second substrate 20 may be a color film substrate, and a color blocking layer and a black matrix may be provided on the color film substrate. The color blocking layer may include a plurality of color blocker, and each color blocker may correspond to a sub-pixel region. For example, the color block may include a red color blocker, a green color block, and a blue color blocker, etc.

Further, the display panel may also include other structures to form the display panel, such as a liquid crystal layer 60 disposed between the array substrate and the color film substrate, spacers for supporting the liquid crystal layer 60, and a protective layer 70 provided on the second pressure sensing electrode 40, etc. Other structures may be included.

Further, as shown in FIG. 5, the first pressure sensing electrodes 30 may be provided on one side of the first substrate 10 facing towards the second substrate 20, and the second pressure sensing electrode 40 may be disposed on one side of the second substrate 20 facing away from the first substrate 10. Of course, the first pressure sensing electrode and the second pressure sensing electrode 40 may also be provided at other locations.

In certain other embodiments, when the display panel is an organic light emitting display panel, the second substrate 20 may be a packaging substrate, a cover glass, a protective layer, a package layer, or a polarizing plate, etc., in the organic light emitting display panel.

Figure 6:
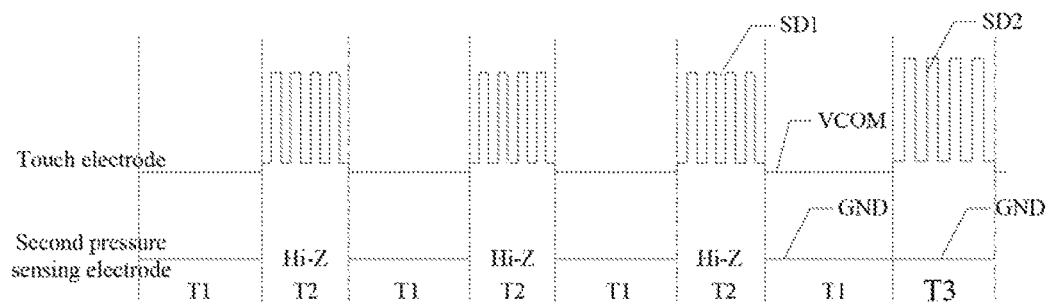
FIG. 6 illustrates an exemplary driving sequence of a display panel consistent with the disclosed embodiments.

Further, in the present disclosure also provides a driving method that can be applied to the above-described display panels. FIG. 6, illustrates an exemplary driving met consistent with the disclosed embodiments.

As shown in FIG. 6, driving voltage signals are provided for the touch electrode, as multiplexed as the first pressure sensing electrode, and the second pressure sensing electrode. Three driving stages are shown as T1, T2, and T3, where T1 is an image display period, T2 is a touch position detection period, and T3 is a touch force detection period. Further, the image display period T1 and the touch position detection period T2 can be alternatingly applied for each frame to be displayed, and the two periods do not interfere with each other.

Further, because the touch force detection does not require a quick reporting response (i.e., the pressing time is generally sufficiently long), the touch force detection T3 can be performed at the end of each frame (i.e., in the gap between two adjacent frames). However, other arrangements of the image display period T1, the touch position detection period T2, and the touch force detection period T3 may also be used.

Further, during the touch position detection period T2, a first drive signal SD1 may be supplied to the touch electrodes 30 and, under the first drive signal SD1, electric field lines formed by the various touch electrodes 30 may pass through the openings of the second pressure sensing electrode 40 to couple with the user's finger, which further cause a change in the potential of the touch electrodes. Thus, the touch electrode 30 can receive the touch position detection signals (i.e., the signals after the change of the potential) and, based on the different touch position detection signals and the positions of the electrodes 30, the touch position of the user's finger can be determined.

In the touch force detection period T3, the touch electrodes 30 are multiplexed into the first pressure sensing electrodes, and a second drive signal SD2 may be supplied to the first pressure sensing electrodes, while a fixed voltage is supplied to the second pressure sensing electrode 40 (e.g., the ground signal GND, or the common voltage signal VCOM). When the external object applies pressure to the second pressure sensing electrode 40, the distance between the first pressure sensing electrodes and the second pressure sensing electrode 40 may be changed, and the capacitance value of the capacitors formed by the first pressure sensing electrode and the second pressure sensing electrode 40 may also be changed. Thus, based on the force detection signals reflecting the change in the capacitance received by the first pressure sensing electrodes, the size of the touch force from the user's finger can be determined by combining the various capacitance values of the capacitors.

Further, in the touch position detection period T2, the second pressure sensing electrode 40 may be set to floating, i.e., Hi-Z (high-impedance) shown in FIG. 6, such that the voltage signal on the second pressure sensing electrode 40 does not interfere with the touch position detection.

In the image display period T1, the touch electrodes 30 may be multiplexed as a common electrode, and the common voltage signal VCOM can be supplied to the touch electrodes 30. At the same time, the second pressure sensing electrode 40 may be grounded, i.e., the ground signal GND is supplied to the second pressure sensing electrode 40. The common voltage signal VCOM provided by the common electrodes can form an electric field with the voltage in the pixel electrode to control on and off of the optical switch of the pixels, displaying different images.

Figure 7:
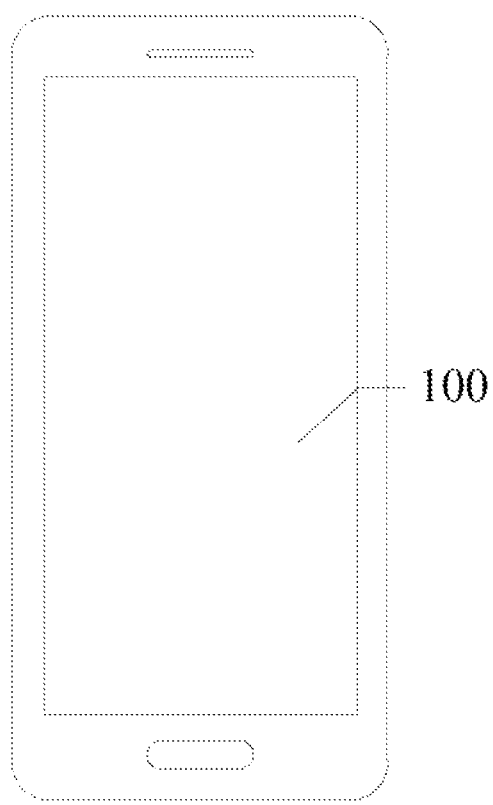
FIG. 7 illustrates an exemplary touch-control display device consistent with the disclosed embodiments.

The present disclosure also provides a touch display device that may include the above-described display panel. FIG. 7 illustrates an exemplary touch display device consistent with the disclosed embodiments. As shown in FIG. 7, the touch display device may be, for example, a mobile phone including a display panel 100, which may be an above-described display panel. Of course, the touch display device may be any appropriate display device, such as a liquid crystal display, an electronic paper, an organic light emitting display, a tablet computer, a television set, a notebook computer, a digital photo frame, or a navigator, or any product or component having a display function.

After taking into consideration the specification and practicing the embodiments disclosed herein, those skilled in the relevant art may easily obtain other embodiments of the present disclosure. The present disclosure is intended to cover any variation, usage, or adaptable change of the present disclosure. These variations, usages, or adaptable changes may obey general principles of the present disclosure and include common knowledge or common technical solutions not disclosed by the present disclosure in the relevant technical field. The specification and the embodiments are merely exemplary, and the true scope and spirit of the present disclosure are defined by the appended claims.

What is claimed is:

1. A display panel, comprising:
a plurality of touch electrodes disposed on a first substrate, wherein the plurality of touch electrodes are used for touch position detection in a touch position detection period, and at least certain number of the plurality of touch electrodes are multiplexed as first pressure sensing electrodes in a touch force detection period; and
a second pressure sensing electrode disposed on a second substrate facing the first substrate and in a grid-shape, wherein orthogonal projection of the first pressure sensing electrodes on the second substrate is at least partially overlapped with the second pressure sensing electrode,
wherein, in the touch force detection period, the first pressure sensing electrodes and the second pressure sensing electrode are used together to detect a touch force applied on the display panel,
the second pressure sensing electrode includes grid lines and grid openings surrounded by the grid lines, and
orthogonal projections, on the first substrate, of at least certain number of the grid openings in the second pressure sensing electrode overlap with corresponding first pressure sensing electrodes disposed on the first substrate.

2. The display panel according to claim 1, wherein:
in an image display period, the plurality of touch electrodes are multiplexed as a common electrode.

3. The display panel according to claim 1, wherein:
the second pressure sensing electrode is made of indium tin oxide (ITO).

4. The display panel according to claim 1, wherein:
a sum $S_1$ of areas of the grid openings satisfies a predetermined condition as:

$S_1/S_0 > 60\%$, wherein $S_0$ is an area of a plate electrode having a same contour as the second pressure sensing electrode.

5. The display panel according to claim 1, wherein:
an area $S_3$ of grid openings directly facing a first pressure sensing electrode satisfies a second predetermined condition as:

$S_3/S_4 < 1 - C_m/(\tau \alpha C_0)$, wherein $S_4$ is an area of the first pressure sensing electrode, $C_m$ is a capacitance threshold, $\tau$ is a capacitance attenuation coefficient, and $C_0$ is a capacitance value between the first pressure sensing electrode and a hypothetical electrode, wherein the hypothetical electrode is a plate electrode in a layer same as the second pressure sensing electrode and having a same contour as the first pressure sensing electrode.

6. The display panel according to claim 1, wherein:
an area $S_3$ of grid openings directly facing a first pressure sensing electrode satisfies a second predetermined condition as:

$S_3/S_4 < 66.7\%$, wherein $S_4$ is an area of the first pressure sensing electrode.

7. The display panel according to claim 1, wherein:
an area of a grid opening in the second pressure sensing electrode directly facing a first pressure sensing electrode is smaller than an area of a grid opening in the second pressure sensing electrode not directly facing a first pressure sensing electrode.

8. The display panel according to claim 1, wherein:
the second substrate further includes a black matrix region, and the grid lines are within the black matrix region.

9. The display panel according to claim 1, wherein:
the first pressure sensing electrodes are disposed on one side of the first substrate facing the second substrate; and
the second pressure sensing electrode is disposed on one side of the second substrate facing away from the first substrate.

10. The display panel according to claim 9, further including:
a transparent elastic material layer disposed between the first pressure sensing electrodes and the second pressure sensing electrode.

11. The display panel according to claim 10, wherein:
the transparent elastic material layer is disposed between the second pressure sensing electrode and the second substrate.

12. The display panel according to claim 9, wherein:
the first substrate is an array substrate; and
the second substrate is a color film substrate.

13. A display device comprising the display panel according to claim 1.

14. A display panel 4, comprising:
a plurality of touch electrodes disposed on a first substrate, wherein the plurality of touch electrodes are used for touch position detection in a touch position detection period, and at least certain number of the plurality of touch electrodes are multiplexed as first pressure sensing electrodes in a touch force detection period; and
a second pressure sensing electrode disposed on a second substrate facing the first substrate and in a grid-shape, wherein orthogonal projection of the first pressure sensing electrodes on the second substrate is at least partially overlapped with the second pressure sensing electrode,
wherein, in the touch force detection period, the first pressure sensing electrodes and the second pressure sensing electrode are used together to detect a touch force applied on the display panel,
the second pressure sensing electrode includes grid lines and grid openings surrounded by the grid lines,
a sum $S_1$ of areas of the grid openings satisfies a first predetermined condition as:

$S_1/S_0 > 1 - K \times R_0/R_m$, wherein $S_0$ is an area of a plate electrode having a same contour as the second pressure sensing electrode, K is a shielding effect attenuation coefficient, $R_0$ is an impedance value of the plate electrode, and $R_m$ is an impedance threshold.

15. A driving method for a display panel having a plurality of touch electrodes disposed on a first substrate and a second pressure sensing electrode disposed on a second substrate facing the first substrate and having grid lines and grid openings surrounded by the grid lines, wherein orthogonal projections, on the first substrate, of at least certain number of the grid openings in the second pressure sensing electrode overlap with corresponding first pressure sensing electrodes disposed on the first substrate, the driving method comprising:
in a touch position detection period, supplying the plurality of touch electrodes with a first drive signal, and receiving touch position detection signals through the plurality of touch electrodes; and
in a touch force detection period, multiplexing at least certain number of the plurality of touch electrodes as first pressure sensing electrodes, supplying the first pressure sensing electrodes with a second drive signal, supplying the second pressure sensing electrode with a fixed voltage, and receiving force detection signals through the first pressure sensing electrodes.

16. The driving method according to claim 15, further including:
in an image display period, multiplexing the plurality of touch electrodes as a common electrode, and supplying the plurality of touch electrodes with a common voltage signal.

17. The driving method according to claim 15, wherein:
in the touch position detection period, setting the second pressure sensing electrode to floating.

\* \* \* \* \*